DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED FEBRUARY 24, 1970

871 O.G. 1023

T871,009
PHOTOSENSITIVE POLYMERS

Douglas G. Borden and Jack L. R. Williams, both of Kodak Park, Rochester, N.Y. 14650

Filed Sept. 30, 1969, Ser. No. 862,479
**Int. Cl. G03c *1/68***
U.S. Cl. 96—115
No Drawing. 7 Pages Specification

There are disclosed light-sensitive polymers containing recurring groups having the formula

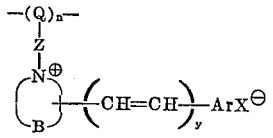

wherein Q is a unit in the parent polymer chain (e.g., $$-CH_2\underset{|}{C}H-)$$

Z is an organic residue comprising one or more atoms, $X^{\ominus}$ is an anion, $y$ equals 1 or 2, —Ar is an aromatic or a heterocyclic group , and B represents the atoms necessary to complete a 5 to 6 membered heterocyclic ring. Such polymers are prepared, for example, by reacting a polymer containing a plurality of hydroxyl groups, such as poly(vinyl alcohol), with a C-vinylheterocyclic quaternary salt containing on the quaternary nitrogen atom a chain of atoms terminated by an isocyanate group; or by the reaction of a parent polymer having a multiplicity of side chains bearing functional groups capable of quaternizing tertiary nitrogen atoms, with C-vinylheterocyclic compounds containing tertiary nitrogen atoms. Examples of the polymers given are poly(1-vinyloxycarbonylmethylene - 4′ - methoxy - 4 - stilbazolium chloride); poly(1 - vinyloxycarbonylmethylene - 2 - stilbazolium chloride); poly(1 - vinyloxycarbonylmethylene - 4 - stilbazolium chloride; a polymer obtained by the reaction of poly(vinyl alcohol) and 1-(2-isocyanatoethyl)-4′-methoxy-4-stilbazolium chloride); and a polymer obtained by the reaction of polyvinyl alcohol with 1-(3-isocyanatopropionyl)-4′-methoxy-4-stilbazolium bromide. The light-sensitive polymers are useful in photomechanical reproduction processes such as for lithographic purposes or as photoresists.